ELECTRON-TUBE CIRCUIT FOR AMPLITUDE COMPARISON

Filed May 22, 1952 2 Sheets-Sheet 1

INVENTOR
Yeo Pay Yu
BY Philip S. Hilbert
ATTORNEY

ELECTRON-TUBE CIRCUIT FOR AMPLITUDE COMPARISON

Filed May 22, 1952 2 Sheets-Sheet 2

INVENTOR
Yeo Pay Yu
BY Philip S. Hilbert
ATTORNEY

United States Patent Office 2,767,314

Patented Oct. 16, 1956

2,767,314

ELECTRON-TUBE CIRCUIT FOR AMPLITUDE COMPARISON

Yeo Pay Yu, Passaic, N. J.

Application May 22, 1952, Serial No. 289,410

16 Claims. (Cl. 250—27)

This invention relates to a new electron-tube circuit, more particularly to a circuit which will respond to a definite potential (this potential will be called the critical potential in this application) of a given voltage or current waveform.

An object of this invention is to provide an electron-tube circuit which generates a sharp pulse (or a definite number of pulses) when a given voltage or current waveform reaches a critical point, then returns immediately to its normal quiescent state regardless of whether the given waveform is above or below the critical point. Another object of this invention is to define the instant during which a given voltage or current waveform passes through a certain critical point on its negative (or positive) slope by the stable and sharp-break characteristic of nonlinear elements, such as germanium diodes.

Another object of this invention is to improve the existing amplitude comparator circuits of the prior art. Circuits in the prior art only can jump from a normal quiescent state to an active state but cannot return to the normal quiescent state if the input signal stays above (or below) the critical potential after increasing from a value below the critical potential. Similar conditions occur when the input signal stays at a value exactly equal to the critical potential. The conventional amplitude comparator circuits will return to their normal quiescent state only when the input returns to a value below (or above) its critical point. Another disadvantage of the conventional amplitude comparator circuits is that when they are held in their active state by the input waveform for a period longer than the time constant of the regenerative feedback circuit employed, relaxation or "bouncing" takes place.

Another object of this invention is to improve the conventional amplitude comparator circuits to permit return to its normal quiescent state as soon as the input waveform passes through the critical potential. Another object of this invention is to eliminate the disadvantages of relaxation oscillations or "bouncing" no matter how long the input waveform remains at a particular value (or values).

Other objects and advantages will become apparent from the specifications taken in connection with the accompanying drawings wherein the invention is embodied in concrete form.

Figure 1:
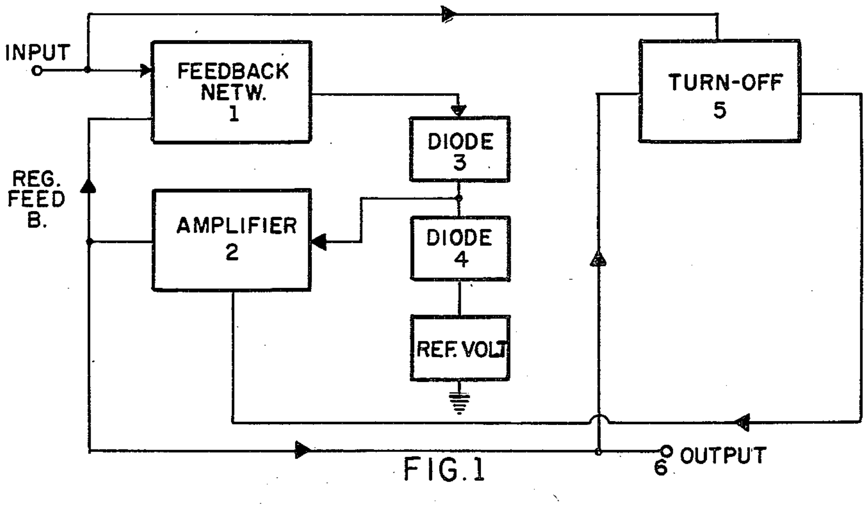
Figure 1 shows a block diagram of this invention which will be used to explain the operating principles of this invention.

Figure 1 shows a block diagram of the invention. Feedback network 1 may consist of a transformer, RC, RL, LC, or RLC elements where R, L, and C designate resistance, inductance and capacitance. The loop gain of amplifier 2 and feedback network 1 with diode 3 conducting and diode 4 cutoff should be equal to or greater than one, and its frequency response should be wide enough to permit the generation of output pulses with desired duration and rise-time. Diodes 3 and 4 can be germanium diodes, vacuum diodes, or other nonlinear elements. Furthermore, a linear resistance of proper value can be used to replace diode 4. Turn-off circuit 5 can be a bistable multi-vibrator or a simple switching circuit capable of being switched on and off by the input signal voltage. Whenever the negative slope or the positive slope of an input signal reaches a potential equal to that of the reference voltage, the circuit will generate a sharp positive (or negative) pulse at the output terminal. For example, diodes 3 and 4 are so connected that the first is cutoff and the second is conducting when the input waveform is below the reference potential. When the loop gain of the amplifier 2 and regenerative feedback network 1 is very small, much less than one, no oscillation can take place. As soon as the input waveform reaches the critical potential while increasing from a lower value, diode 3 begins to conduct and the said regenerative feedback loop of amplifier 2 is therefore closed. Then the said amplifier 2 begins to oscillate and a pulse will proceed to its output terminal 6. This pulse serves as the output signal of this circuit and at the same time it serves also as the trigger pulse for initiating the turn-off unit 5. The turn-off unit 5 is employed to disable the amplifier 2 after generating the first output pulse. Then the amplifier 2 will not be able to generate a second pulse during the same cycle of the input waveform. During the next cycle, the turn-off unit 5 becomes inactive as soon as the input waveform returns to a point slightly below the reference potential from its negative half cycle. The said amplifier is thereby switched on with the regenerative feedback loop opened. As soon as the positive slope of the said input waveform reaches the critical potential, the regenerative feedback loop closes, a pulse appears at the output terminal 6, and the process described above will repeat again.

Figure 2:
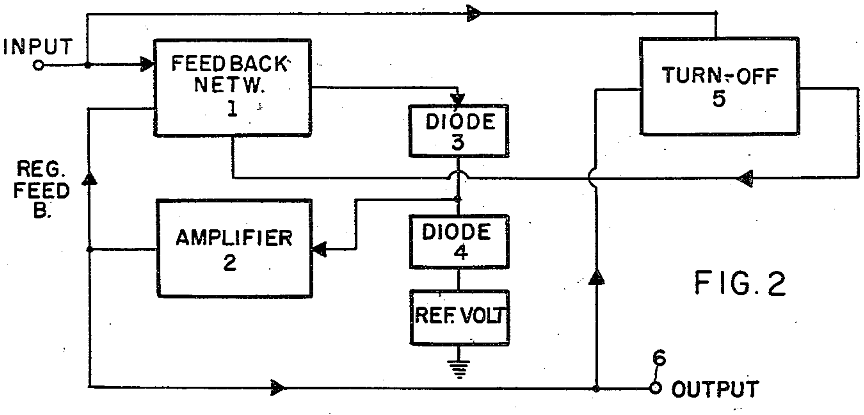
Figure 2 shows another block diagram embodying the principles of this invention.

The block diagram of Figure 2 shows a variation of Figure 1. In this figure, the turn-off unit 5 is employed to control the feedback network 1 which may include any device, such as a vacuum tube, capable of being switched off or made non-conductive by a pulse from the turn-off unit 5, which may be a multivibrator. As soon as an output pulse appears at the output terminal 6, the turn-off unit becomes active and disables the feedback network 1; therefore only one output pulse appears at the exact instant when the input waveform reaches the critical potential. In all other respects the circuit of Fig. 2 is similar to, and operates in the same manner, as that of Fig. 1.

Figure 3:
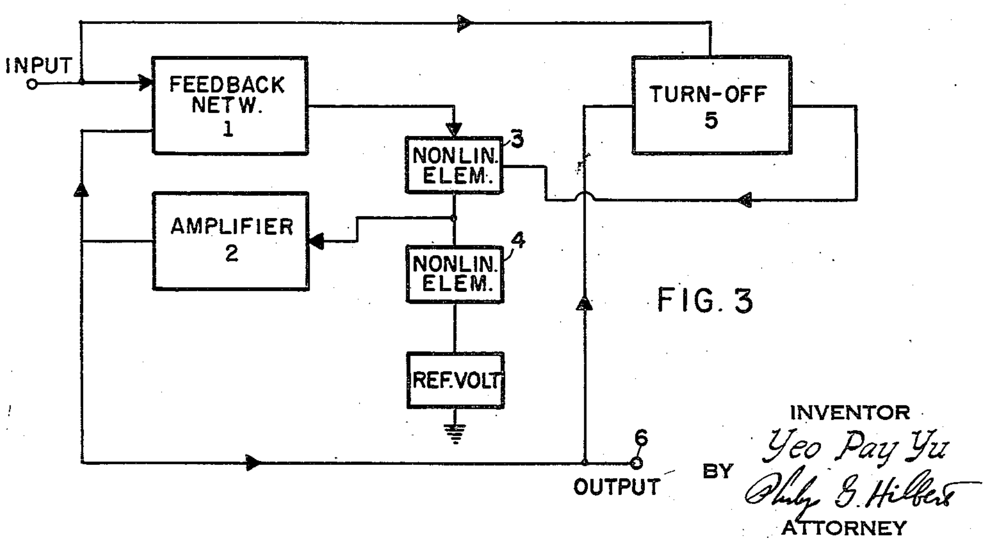
Figure 3 shows another block diagram embodying the principles of this invention.

The block diagram of Figure 3 shows another variation of Figure 1. In this figure, the turn-off unit 5 is employed to control the non-linear element 3 which may be any device, such as a vacuum tube, capable of being blocked by a voltage pulse. The operating principles are essentially identical to those of Figures 1 and 2. It is desirable to mention that the turn-off unit may also be employed to control the nonlinear element 4 instead of 3. The various elements of Fig. 3 are similar to correspondingly numbered elements of Figs. 1 and 6.

Figure 4:
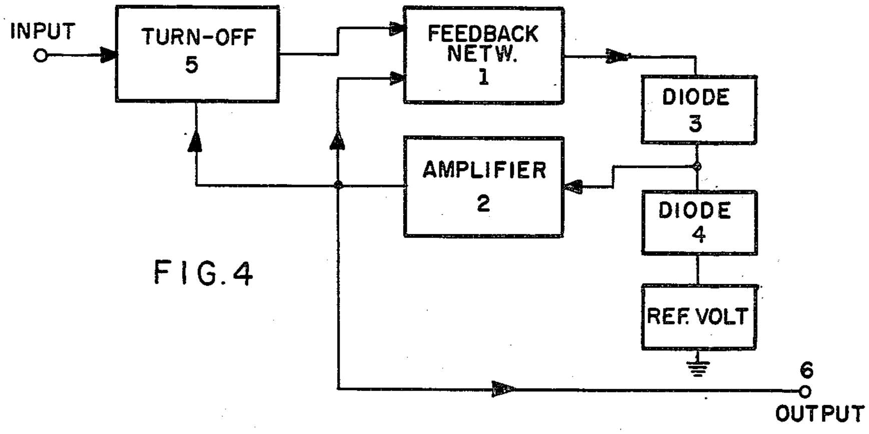
Figure 4 shows a further block diagram embodying the principles of this invention.

The block diagram of Figure 4 shows a further variation of Figure 1. In this figure, the turn-off unit 5 is employed to control the input of the feedback unit 1 and amplifier 2. The feedback unit may include an element such as a vacuum tube capable of changing its conductivity in response to a voltage pulse. As soon as an output pulse appears at the output terminal 6 also at the turn-off unit 5, the turn-off unit 5, which may be a multivibrator, changes the waveform at the input of feedback unit 1 and amplifier 2 in such a manner that oscillation will terminate immediately.

Figure 5:
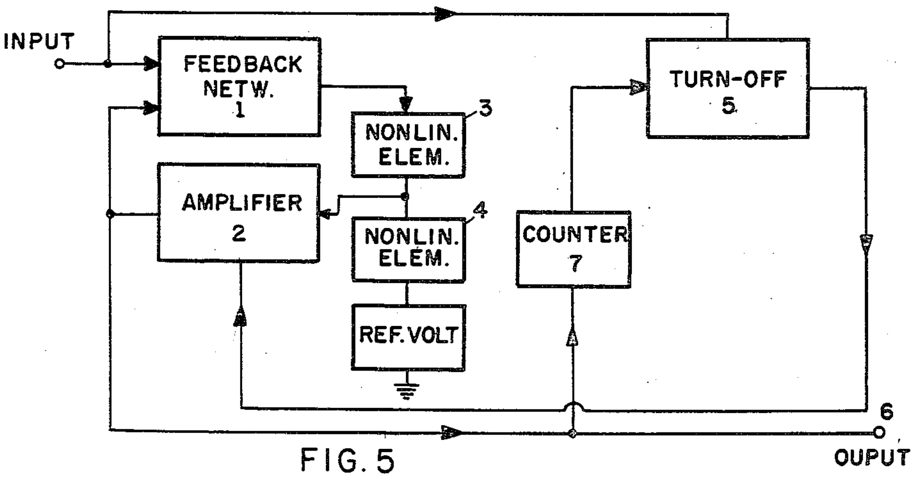
Figure 5 shows a further block diagram embodying the principles of this invention.

The block diagram of Figure 5 shows a counter unit 7 which produces an output pulse after a given number of pulses are fed thereto, so that more than one pulse can be obtained at the output terminal 6 for each cycle of the input waveform. It is understood that such a counter circuit can also be installed in the block diagram of Figures 2 and 3 and 4 if it is so desired.

Furthermore, it should be noticed that the potential of the reference signal does not have to be constant. It can be made variable by means of manual controls or other means at a desirable speed and repetition rate.

Figure 6:
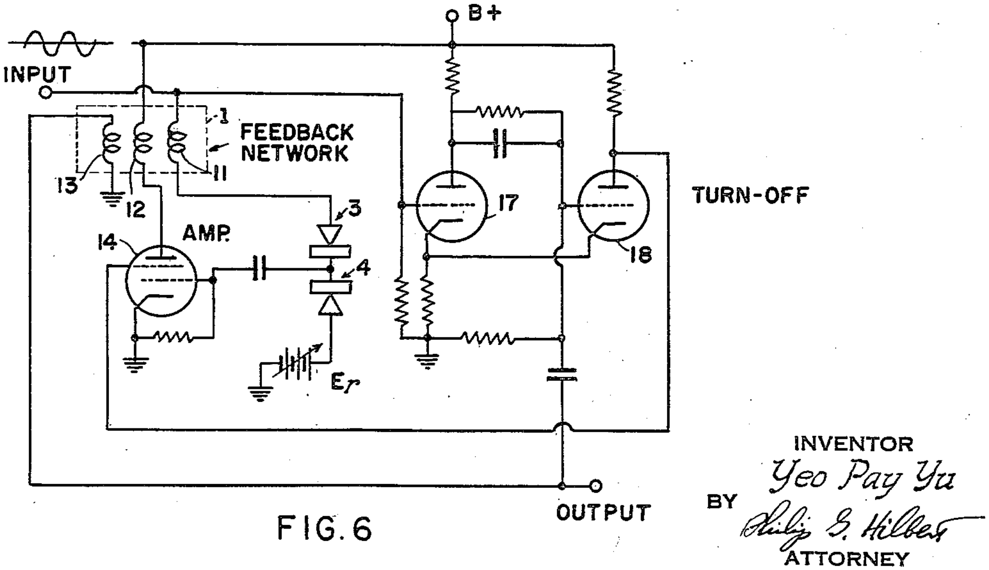
Figure 6 shows a practical circuit diagram which will produce a short positive pulse at the exact instant at which the negative slope of the waveform of the input voltage reaches a value equal to that of a reference voltage.

The circuit of Figure 6 shows the details of one form of the invention. Diodes 3 and 4, as mentioned in connection with Fig. 1, may be germanium diodes having their anodes connected together directly. The feedback network 1 consists of a transformer having three windings 11, 12, 13. The amplifier consists of a single multigrid tube, such as pentode 14, the suppressor grid of which is not shown. The directions of windings 11 and 12 are so arranged that the mutual coupling between these two windings will produce regenerative feedback for the amplifier pentode 14. Diodes 3 and 4 are so connected that the first is cutoff and the latter is conducting when the potential input waveform is above the reference potential, and the condition will be reversed when the potential of the input waveform is below the reference potential. These two conditions can obviously be obtained if the reference potential has any value intermediate the peak voltages of the input wave. The reference voltage $E_r$ is connected at one side to the cathode of diode 4 and at its other side is connected to ground, as is conventional. The turn-off unit consists of triodes 17 and 18 connected as a bistable multi-vibrator. When the input is above the reference potential, diode 3 is cutoff, diode 4 is conducting, and the loop gain of the amplifier and feedback network is smaller than one. Thus no oscillation can take place. As soon as the negative slope of the input waveform reaches a potential equal to the reference potential $E_r$, diode 3 conducts the regenerative feedback loop closes, and a positive pulse proceeds to the output terminal. This positive pulse also causes triode 18 of the turn-off unit to conduct. Then the potential at the plate of triode 18 drops. This in turn decreases the screen potential of pentode 14 and terminates the oscillation of the amplifier and feedback transformer. As soon as the potential of the input waveform is above the reference potential $E_r$, triode 17 conducts and triode 18 is cutoff, the screen potential of pentode 14 becomes high enough to allow the amplifier to function. However, diode 3 is cutoff, the regenerative feedback is opened, no oscillation can take place. As soon as the input waveform decreases to a potential equal to that of the reference voltage $E_r$, diode 3 conducts, oscillation takes place, and the described switching action will repeat again.

Since no coupling condenser is needed in this circuit for receiving the input signal, the low end of frequency response can be extended to zero cycle per second, and the high end is limited only by the stray capacitances of the tubes employed. Another advantage is that the accuracy and function of the circuit is not affected by the harmonic contents, shape, or the degree of symmetry of the input signal.

It will be understood that various changes in the details of construction and in arrangement of parts may be made without departing from the underlying idea or principles of this invention within the scope of the appended claims.

I claim:

1. An electronic circuit comprising a closed regenerative loop circuit including an amplifier and a regenerative feedback network connected between the output and input of the amplifier, a first means in series with said loop circuit for varying the gain of said loop circuit, an input circuit coupled to said first means for supplying an input signal thereto, a second means connected to said first means for causing said first means to increase the gain round said loop circuit from a value less than unity to a value at least equal to unity when the amplitude of the input signal reaches a predetermined value, output circuit means connected to said loop circuit for deriving output signals therefrom, a third means responsive to a signal in said loop circuit for reducing the gain thereof to a value less than unity before any oscillations occur in said loop circuit and means responsive to the input signal for terminating the gain reducing action of the third means immediately upon the attainment by the input signal of a second predetermined amplitude.

2. An electronic circuit as described in claim 1 wherein said first means includes an electronic valve and said second means applies a reference potential to said valve to bias it to a non-conductive condition.

3. An electronic circuit as described in claim 1 wherein said first means includes a diode and said second means includes a second diode, said diodes having one pair of like electrodes connected together, the other electrode of second diode being at a reference potential.

4. An electronic circuit as described in claim 1 wherein the third means includes a double stability multivibrator circuit and means for causing the output signal to trigger the multivibrator to one of its two stable states.

5. A circuit as described in claim 4 wherein said third means includes a connection between the multivibrator circuit and the input circuit for causing the multivibrator to be triggered to the other of its two stable states by the input signal.

6. A circuit as described in claim 1 wherein said third means is connected to control the gain of said amplifier.

7. A circuit as described in claim 1 wherein said third means is connected to control the feedback network.

8. A circuit as described in claim 1 wherein said third means is connected to control said first means.

9. A circuit as described in claim 1 wherein said third means is connected to the output circuit by a means for impressing a single output pulse on said third means in response to a predetermined number of output signals.

10. An electronic circuit comprising a closed loop circuit including an amplifier and a regenerative feedback network connected between the output and the input of the amplifier, means supplying a first variable signal and a second signal, means for increasing the gain round said loop circuit from a value less than unity to a value at least equal to unity when the first signal reaches a predetermined value relative to the second signal, an output circuit connected to said amplifier, means including a non-oscillatory flip-flop circuit connected to the output circuit for reducing said gain of the loop circuit to substantially zero before any oscillations occur in said loop circuit and means for triggering said flip-flop circuit by the output of said amplifier when the gain of the loop circuit is greater than unity and then triggering the flip-flop circuit with the input signal when the gain of the loop circuit is substantially zero.

11. An electronic circuit comprising a closed loop circuit including an amplifier and a non-resonant regenerative feedback network a first means connected between the network and the input of the amplifier having a first condition of low conductivity during which the loop circuit has a gain less than unity and a second condition of high conductivity, said loop circuit being adjusted so that the maximum gain round the loop circuit is equal at least to unity, an input signal circuit coupled to said loop circuit, an output signal circuit connected to said loop circuit, a second means connected to said first means for causing asid first means to change from its first condition to its second condition when the input signal enters a predetermined range of values and to cause said first means to return to its first condition when the input signal amplitude leaves said range of values, and a third means for reducing the gain of the loop circuit in response to an output signal to a value less than unity and for maintaining the gain at said last mentioned value until the first mentioned means returns to its first condition.

12. An electronic circuit for producing an output pulse when a variable input signal has a predetermined amplitude, comprising an amplifier, first means connecting an input signal circuit to the input of the amplifier, second means for preventing the input signal from being impressed on the input of the amplifier until the amplitude of the input signal reaches a first predetermined value, third means for biasing the amplifier to cutoff as soon as the output signal of the amplifier reaches a second predetermined value and for maintaining the amplifier biased to cutoff until the input signal again reaches the first predetermined value and thereupon removing the bias, and means for preventing the input signal from being applied to the amplifier from the time the bias is removed to the time when the signal amplitude again reaches the first predetermined value.

13. An electronic circuit as in claim 12 wherein said second means applies the input signal to the amplifier substantially only during the intervals when the signal potential is less than said first predetermined value and the third means removes the bias only during the intervals when the signal potential is substantially equal to or greater than said first predetermined value.

14. An electronic circuit as in claim 13, wherein the amplifier is provided with a regenerative feedback network.

15. An electronic circuit as in claim 14, wherein the third means includes a multivibrator having a pair of electron valves, each valve having a load connected thereto and a control electrode, and a direct current connection from the load of each valve to the control electrode of the other valve, whereby said multivibrator is non-oscillatory.

16. An electronic circuit as in claim 15, including a direct current connection from the input signal circuit to the control electrode of one of said valves.

References Cited in the file of this patent

UNITED STATES PATENTS

| | | |
|---|---|---|
| 2,404,047 | Flory et al. | July 16, 1946 |
| 2,419,570 | Labin et al. | Apr. 29, 1947 |
| 2,482,973 | Gordon | Sept. 27, 1949 |
| 2,577,475 | Miller | Dec. 4, 1951 |
| 2,658,997 | Carbrey et al. | Nov. 10, 1953 |